March 14, 1939.　　　　J. B. SWORD　　　　2,150,615
TRAILER CONSTRUCTION
Filed March 23, 1937　　　2 Sheets-Sheet 1
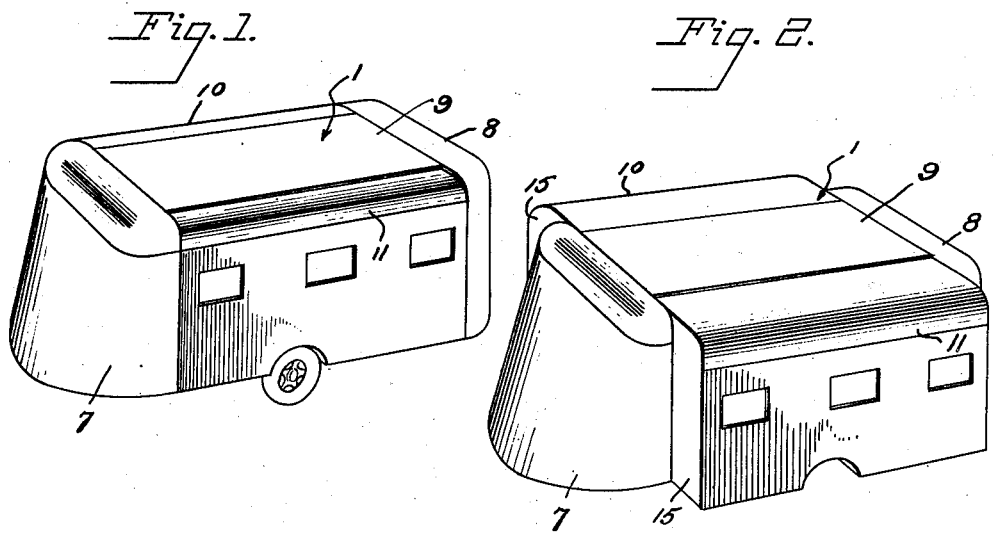
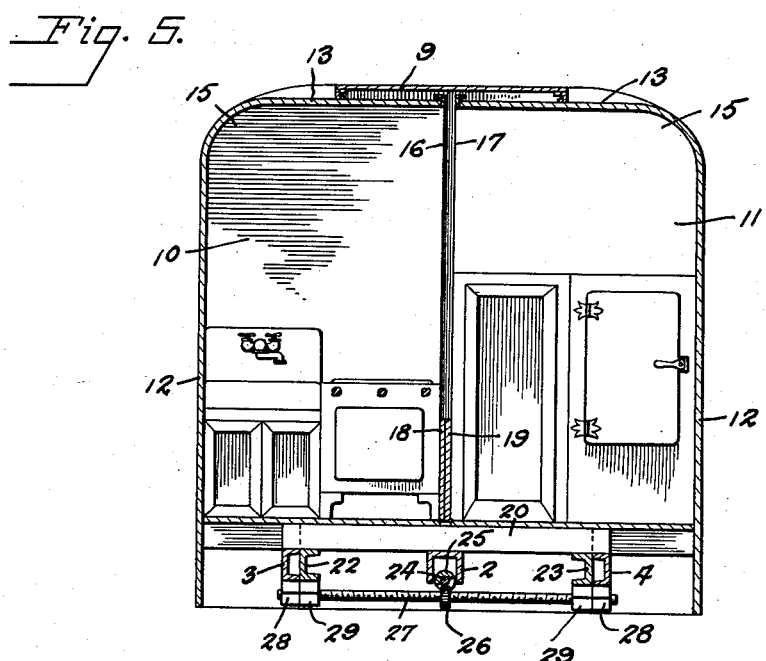
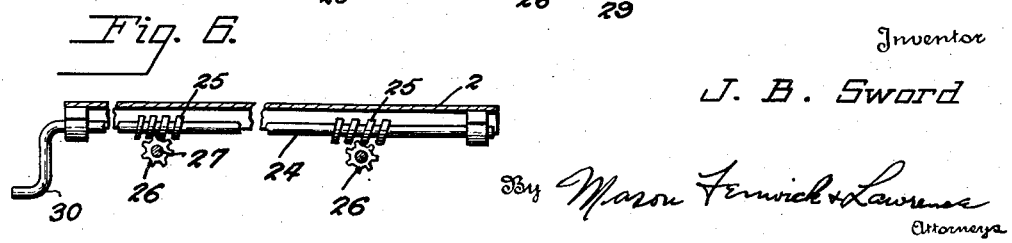
Inventor
J. B. Sword
By Mason Fenwick & Lawrence
Attorneys March 14, 1939.  J. B. SWORD  2,150,615
TRAILER CONSTRUCTION
Filed March 23, 1937  2 Sheets-Sheet 2
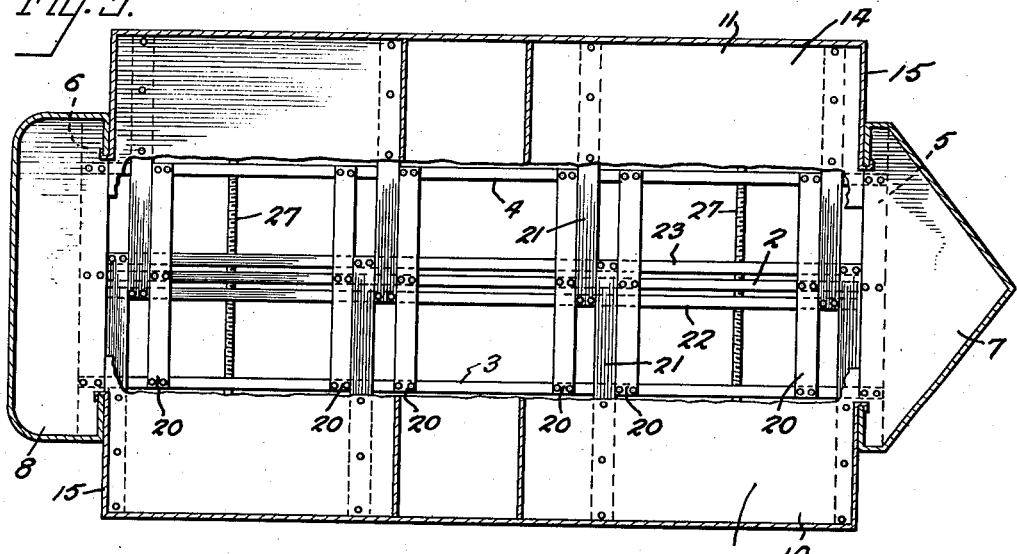
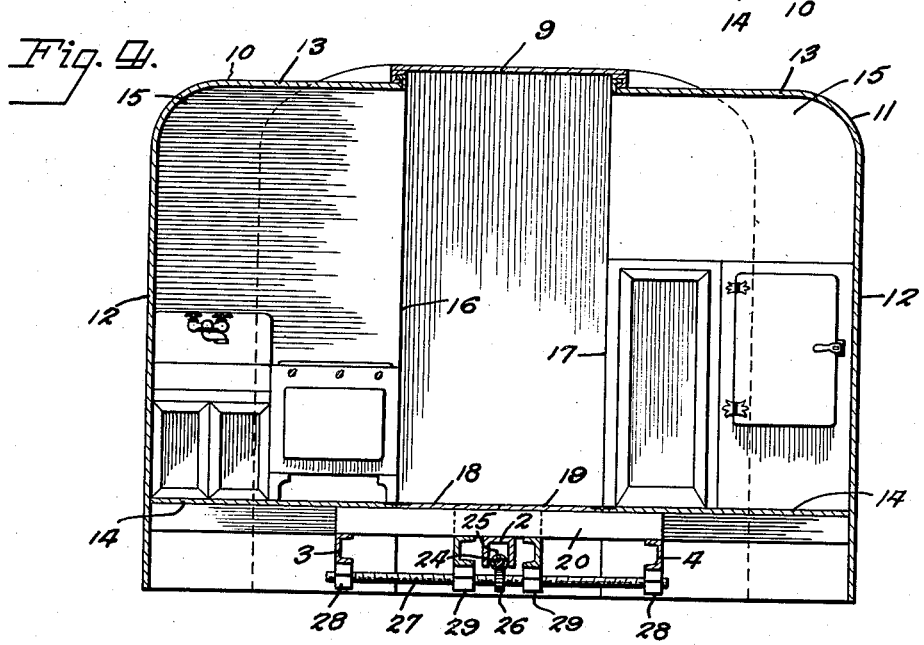
Inventor
J. B. Sword Patented Mar. 14, 1939

2,150,615

UNITED STATES PATENT OFFICE 2,150,615

TRAILER CONSTRUCTION

James B. Sword, Stone Harbor, N. J.

Application March 23, 1937, Serial No. 132,602

6 Claims. (Cl. 296—26)

This invention relates to travelling cabins or trailers of the type having expansible and contractable furnished side sections so that when on the highway, the trailer is reduced to safe or legal width, while when at the camping place, it may be extended into a room with fixed furniture at the sides and ample aisle space along the middle.

It is a common fault of trailers of this type that the weight of furniture on the extensible side sections causes them to sag when extended and this in turn makes it difficult to slide said sections either to open or closed position. It is uncomfortable as well as unsightly to have the furniture out of plumb, which defect has given rise to makeshift expedients such as the use of jacks for leveling the extended side sections.

The principal object of the present invention is to provide sliding support for the extensible sections in cooperation with rigid chassis members, insuring parallelism of the extensible members when extended.

Another object of the invention is to provide a construction by which when the lateral sections are extended the floor shall be plane and level throughout both those portions which carry the slidable sections and that of the intervening aisle.

Other objects of the invention will appear as the following descriptions of a preferred and practical embodiment thereof proceeds.

In the drawings which accompany and form a part of the following specification and throughout the several figures of which the same characters of reference have been employed to designate identical parts:

Figure 1 is a perspective view of a trailer embodying the principles of the present invention showing the extensible side sections in closed position;

Figure 2 is a similar view showing the side sections in extended position;

Figure 3 is a horizontal section, the flooring of the aisle being broken away to show the underlying structure;

Figure 4 is a transverse vertical section showing the side sections extended;

Figure 5 is a similar view showing the side sections contracted; and

Figure 6 is a broken section in detail illustrating the mechanical means for extending and contracting the side sections.

Referring now in detail to the several figures, the trailer 1 comprises essentially a chassis frame comprising a longitudinal central member 2 and opposite side members 3 and 4 also end members 5 and 6 which are rigidly secured both to the side and central members. The end portions 7 and 8 of the trailer are supported by the end members 5 and 6 and they are bridged at the top by the roof 9, the chassis frame, end members and roof forming a rigid structure leaving side spaces in which slide the side sections 10 and 11. Each side section consists of a vertical outer wall 12, roof portion 13, floor 14 and ends 15.

When the side sections are contracted, their inner edges come substantially together as indicated at 16 and 17, in Figure 5, reducing the width of the vehicle to the normal legal or safe width. When the sections are extended an aisle space is formed as shown in Figure 4, the roof portion 13 interlocking with the fixed roof 9 in a water-tight manner. Hinged flooring sections 18 and 19 are carried by the respective side sections 10 and 11. These flooring sections fold vertically against the inner edges of the side sections as shown in Figure 5 and lie flat as shown in Figure 4 when the side sections are extended forming a floor for the aisle space.

The side sections are designed to be provided with fixed articles of furniture resting upon the floor portions 14. The presence of this furniture makes the side sections relatively heavy and as stated in the objects of the invention, it is the aim of the invention to support these weighty members in extended position without sagging.

With this end in view, the chassis frame is provided with transverse fixed members 20. These are secured to the central member and to the side members on the top surfaces thereof. The fixed members 20 are preferably arranged in spaced pairs, the spaces between the pairs provides guideways for sliding transverse members 21, the outer ends of which are secured to and beneath the floor portions of the side sections. The outer fixed member 20 adjacent each end of the chassis frame cooperates in similar manner with the outermost end members 5 and 6 to form guides for the end pairs of the sliding members 21.

The sliding members 21 on each side of the chassis frame rest upon the longitudinal member on that side and upon the central member 2, extending slightly beyond said central member when the side sections are extended, all as clearly shown in Figure 3. Longitudinal movable members 22 and 23 are positioned beneath and against the fixed members 20 and against the lower faces of the extending ends of the sliding members to which they are originally secured. Thus the longitudinal members 22 and 23 slide with the transverse members 21. The sliding transverse members are of the same height as the fixed transverse members. It is obvious that when the side sections are moved outwardly, the inner ends of the sliding members 21 are kept from moving out of vertical parallelism with one another by the longitudinal members 22 and 23 which underlie and abut the adjacent fixed transverse members 20.

The in and out movement of the side sections may be accomplished by any desirable means. By way of illustration, the drawings show a longitudinal shaft 24 which is journalled beneath the fixed central member 2, the latter being of general form so as to at least in part house the shaft 24. Worms 25 are located at suitable points on the shaft 24 and mesh with gears 26 which are fixed to screw shafts 27 the latter extending transversely of the chassis frame and being journalled in bearings 28 which are mounted on the fixed longitudinal side members 3 and 4. The screw shafts 27 on opposite sides of the gears 26 are threaded in opposite directions. Nuts 29 travel on said threads when the screw shafts 27 are rotated, in and out, accordingly as the direction of rotation of said shafts is rotated by means of the crank 30. The nuts are secured to the longitudinal movable members 22 and 23 and by this means the side sections are extended and contracted.

Since the height of the fixed transverse members 20 and the slidable transverse members 21 is the same and these members at all times lie in a position of side by side parallelism, it follows that when the floor sections 18 and 19 are laid flat, resting upon the fixed and movable transverse members they are in the same plane with the floor portions of the side sections which rest upon the movable transverse members. Consequently, a perfectly flat floor is provided for the trailer when the side sections are extended.

It will be understood that suitable anti-friction means may be provided if and where it is desired to facilitate the action of the movable parts.

While I have in the above described what I believe to be a preferred and practical embodiment of my invention, it will be understood that the specific details of construction and the arrangement of parts as shown and described are by way of illustration and not to be construed as limiting the scope of the appended claims.

What I claim is:

1. Vehicle comprising a chassis frame having a central longitudinal member, right and left side longitudinal members, and transverse members fixed across the tops of said central and side members, right and left laterally extensible body sections for said vehicle, and supporting means therefor comprising right and left transverse sliding members secured at their outer ends beneath the respective extensible sections, said sliding members resting upon the respective side members and said central member, and being of such length when said sections are extended as to project beyond said central member, and longitudinal movable members slidable against the under faces of said fixed transverse members, on opposite sides of said central longitudinal member and fixed to the extended ends of said transverse movable members.

2. Vehicle comprising a chassis frame having a central longitudinal member, right and left longitudinal side members having their upper faces in a common plane, and transverse members fixed across the top of said central and side members, right and left laterally extensible body sections for said vehicle, and supporting means therefor comprising right and left transverse fixed members secured at their outer ends beneath the respective extensible sections, said sliding members resting upon the respective side members and said central member, and being of such length when said sections are extended as to project beyond said central member, and longitudinal movable members slidable against the under faces of said fixed transverse members on opposite sides of said central longitudinal member, and fixed to the extended ends of said transverse movable members.

3. Vehicle comprising a chassis frame having a central longitudinal member, right and left longitudinal side members, said longitudinal members having their upper faces in a common plane, and transverse members fixed across the top of said central and side members, right and left laterally extensible body sections for said vehicle, and supporting means therefor comprising right and left transverse sliding members of the same height as said transverse fixed members, said extensible body sections including floor portions beneath and to which the outer ends of said sliding members are secured, said sliding members resting upon the respective side members and said central member and being of such length when said sections are extended as to project beyond said central member, longitudinal movable members slidable against the under faces of said fixed transverse members on opposite sides of said central longitudinal member and fixed to the extended ends of said transverse movable members, said body sections coming substantially together at their inner sides when in fully contracted position, and floor portions hinged to said body sections in folded position with respect thereto when said sections are in contracted position adapted to lie flat on said transverse fixed members when said body sections are extended forming a continuous flush and plane floor with the floor portions of said sections.

4. Vehicle comprising a chassis frame having a central longitudinal member, and right and left longitudinal side members, the upper faces of said longitudinal central and side members lying in a common plane, transverse members fixed across the tops of said central and side members in spaced pairs, right and left laterally extensible body sections for said vehicle, and supporting means therefor comprising right and left transverse sliding members of the same height as the transverse fixed members secured at their outer ends beneath the respective extensible sections, said sliding members lying in lapped relation between the members of said pairs and guided thereby, resting upon the respective side members and said central member and being of such length when said sections are extended as to project beyond said central member, and longitudinal movable members slidable against the under faces of said fixed transverse members on opposite sides of said central longitudinal member, and fixed to the extended ends of said transverse movable members.

5. Vehicle comprising a chassis frame having a central longitudinal member, and right and left longitudinal side members, said central and longitudinal side members having their upper faces in a common plane, transverse members fixed across the tops of said central and side members, two of said transverse members being adjacent the ends of said longitudinal members, body end sections rigidly secured to said end transverse members, a central longitudinal roof portion bridging the space between said body end sections and rigidly secured thereto, right and left laterally extensible side sections filling the space between said roof and end sections and cooperating therewith to form the vehicle body, said side sections including floor portions, supporting means for said side sections comprising right and left transverse sliding members secured at their outer ends beneath the respective side sections, said sliding members resting upon the respective side frame members and said central member and being of such length when said side sections are extended as to project beyond said central member, longitudinal movable members slidable against the under faces of said fixed transverse members on opposite sides of said central longitudinal member and fixed to the extended ends of said transverse movable members, hinged floor portions carried by said side sections adapted to rest upon said fixed transverse members when said side sections are extended, flush with and in the same plane as the floor portions of said side sections, and means beneath said chassis frame for extending and contracting said side sections.

6. Chassis for laterally expensible vehicle body comprising a rigid rectangular frame including longitudinal side members, end members, a longitudinal middle member, and cross members resting upon said longitudinal members and secured thereto, laterally slidable extensions at opposite sides of said frame, each including transverse members resting upon the adjacent side member and the middle member and of such length as to extend beyond said middle member when said extension is in fully expanded position, and a longitudinal member freely underlying the fixed cross members, secured to the transverse section members on the side of the longitudinal middle member remote from said section and engaging slidably the under faces of said fixed cross members.

JAMES B. SWORD.